United States Patent [19]

Haines

[11] 4,336,021

[45] Jun. 22, 1982

[54] EMERGENCY BELTING AND KIT

[75] Inventor: William M. Haines, Englewood, Colo.

[73] Assignee: The Gates Rubber Company, Denver, Colo.

[21] Appl. No.: 39,069

[22] Filed: May 14, 1979

[51] Int. Cl.³ .............................................. F16G 3/07
[52] U.S. Cl. .................................... 474/256; 411/411; 24/31 B; 24/35
[58] Field of Search ........................... 24/31 R, 31 B; 74/231 J, 234, 238; 85/42, 14, 46; 151/22; 52/98; 411/2, 411, 409, 389; 474/256

[56] References Cited

U.S. PATENT DOCUMENTS

| | | | |
|---|---|---|---|
| 1,330,239 | 2/1920 | Chantrell | 24/31 B |
| 2,827,820 | 3/1958 | DeVellier | 411/411 |
| 3,176,746 | 4/1965 | Walton | 151/22 |
| 3,276,172 | 10/1966 | Alvden | 85/42 X |
| 3,501,971 | 3/1970 | Peterson | 24/31 B X |
| 3,631,732 | 1/1972 | Kleban | 74/231 J |
| 3,788,156 | 1/1974 | Jackson | 74/231 J X |
| 3,942,405 | 3/1976 | Wagner | 85/46 |
| 4,058,022 | 11/1977 | Pickburn | 24/231 B X |
| 4,109,691 | 8/1978 | Wilson | 411/409 |

FOREIGN PATENT DOCUMENTS

| | | | |
|---|---|---|---|
| 892897 | 2/1972 | Canada | 74/231 J |
| 2718562 | 11/1978 | Fed. Rep. of Germany | 411/2 |
| 1440062 | 4/1965 | France | 411/411 |
| 2275679 | 1/1976 | France | 85/42 |
| 17280 | of 1894 | United Kingdom | 85/42 |

Primary Examiner—Roy D. Frazier
Assistant Examiner—Peter A. Aschenbrenner
Attorney, Agent, or Firm—Curtis H. Castleman, Jr.; Raymond Fink; H. W. Oberg, Jr.

[57] ABSTRACT

An endless belt assembly, such as an emergency fan belt, is disclosed including a belt of elastomeric material having internal cavities in the ends, and a unique coupling means fastening the ends of the belt together, including a central shank, and at least one end of the coupling having helical ribs projecting radially outwardly from the shank which grip the walls of the belting to prevent pull-out, and ease fastening of the belt ends together in the field.

10 Claims, 10 Drawing Figures

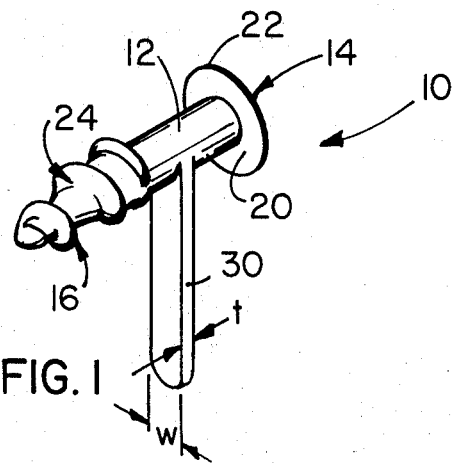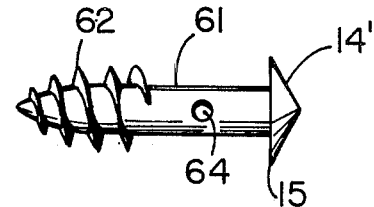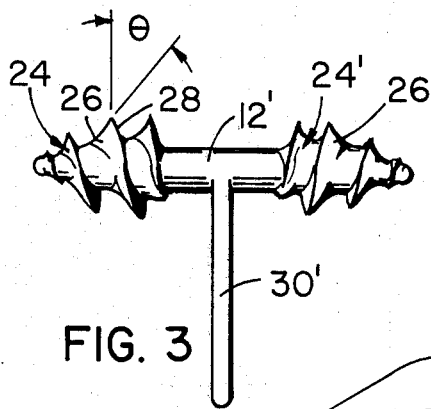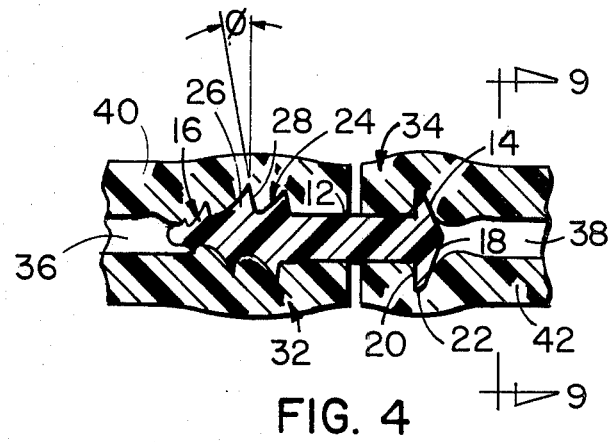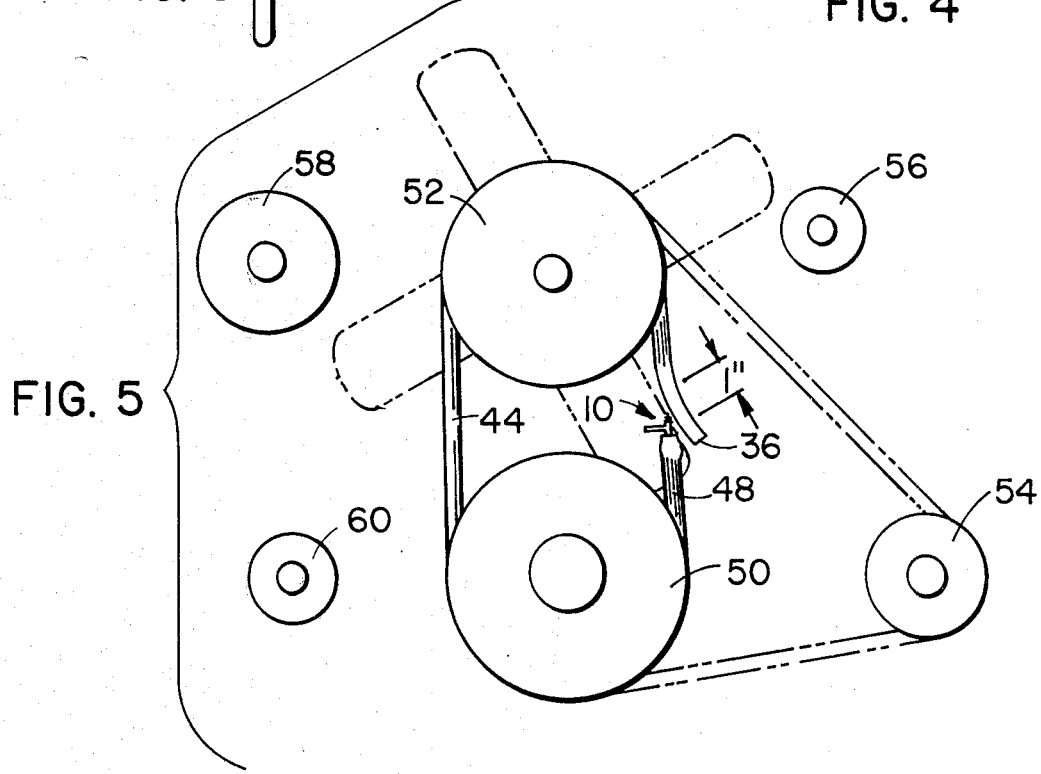

EMERGENCY BELTING AND KIT

BACKGROUND OF THE INVENTION

This invention relates to endless belt assemblies particularly of the cut and splice type for assembly in the field, to a particular coupling means or fastener for joining together the ends of the elastomeric belting, and to an emergency belting kit.

Cut and splice endless belt constructions, and the method for forming the spliced assembly are known, such as shown in U.S. Pat. Nos. 3,461,733 and 3,501,971. Other types of belt connectors are shown in U.S. Pat. Nos. 2,450,519 and 2,605,523. The belting is normally formed of rubber or thermoplastic elastomer, of trapezoidal or extruded tubular form, and fastened together by a coupling means consisting of a central shaft with radially projecting sharp edged gripping heads embedded in the hollowed out ends of the belting, to form a secure splice. While these prior art devices are more or less satisfactory, they are generally difficult to assemble in the field by hand, or the sharp edges tear the polymeric belting under normal loads in an automotive application leading to premature pull-out.

SUMMARY OF THE INVENTION

Briefly described, the endless belt assembly includes a belt of elastomeric material having internal cavities in the ends of the belt, and coupling means having respective end gripping means securely engaged in the internal cavities of the belting, the coupling means having a central shank and having at least one of its respective end gripping means formed of a helical rib projecting radially outwardly from the shank, with the rib penetrating the wall of the elastomeric belt and substantially embedding therein.

The invention is also drawn to the coupling means per se, as well as a kit having component parts capable of being assembled in the field, comprising the aforementioned belt and the coupling means. Preferably there is also included knife means or the like for cutting the belt to the desired length preparatory to assembly of the belt into an endless configuration with the aid of the coupling means.

BRIEF DESCRIPTION OF THE DRAWINGS

The invention will be described in its preferred embodiments in conjunction with the accompanying drawings, in which like parts are designated by like numerals, and wherein:

FIG. 1 is a perspective view of a preferred coupling means for splicing the belting in endless fashion;

FIG. 2 is a side view of a modified coupling means for use in the invention;

FIG. 3 shows an additional modification of the coupling means;

FIG. 4 is a partial elevational section of the ends of the belting (of an endless configuration) joined together by the fastening means of FIG. 1;

FIG. 5 illustrates the technique of assembling the emergency belting as a fan belt in an automotive application;

PREFERRED EMBODIMENTS OF THE INVENTION

Figure 6:
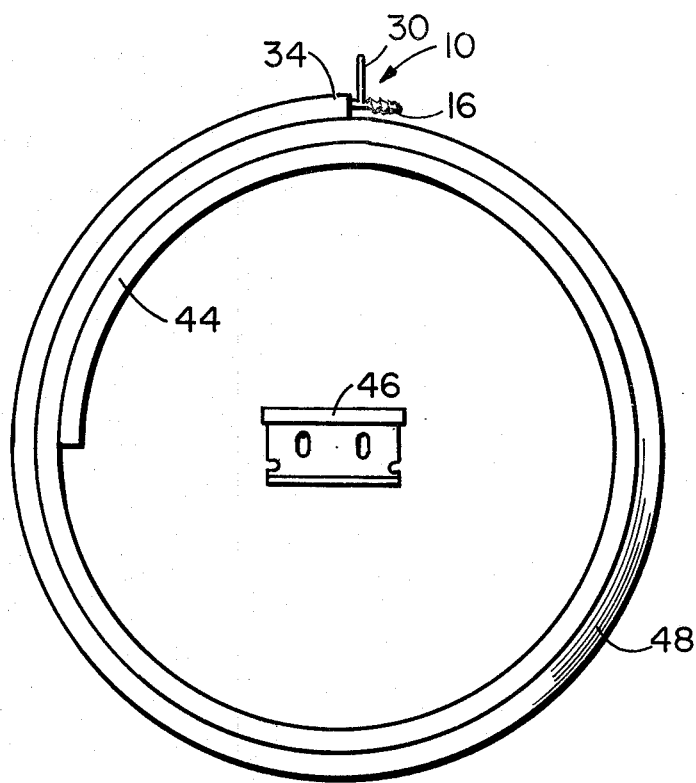
FIG. 6 shows a typical belt assembly kit according to the invention.

The coupling means of FIG. 1 includes a central shank 12 and radially projecting end gripping means 14 and 16. The end gripping head 14 is of conventional design having a cone-shaped head 18 terminating (or intersecting) base 20 in a relatively sharp circular edge 22.

In accordance with the invention, gripping end 16 is formed of helical rib 24 projecting from the shank 12. Preferably a continuous helical rib is employed, preferably of at least two full turns, more preferably of at least three full turns. This continuous helical rib forms a thread having an average pitch preferably from about 0.08 to about 0.16 inches for a fan belt application, and in general from about 50 to about 200, more preferably from about 90 to about 140 percent of the average shank outside dimension (e.g., diameter).

As shown in FIGS. 1, 3 and 4, the helical ribs are asymmetrical in the sense that the threads or ribs 24 have a leading ramp 26 of gentle slope to the vertical (perpendicular to the shank axis), shown as ramp angle $\theta$, as compared with the trailing ramp 28 which makes a relatively steep angle $\phi$. The leading ramp angle $\theta$ is preferably from about 20 to about 60 and more preferably from about 30 to about 45 degrees, as measured with the tangent to the surface. On the other hand trailing ramp angle $\phi$ is preferably from about 0 to about 20, more preferably from about 0 to about 5 degrees. However, the trailing ramp may also be undercut up to about 10 degrees or more ($\phi = -10°$). The gentle slope on the leading ramp facilitates assembly as will be discussed hereafter, and the steep angle formed by the trailing ramp 28 provides holding or gripping power to resist tension pull-out.

In the embodiment of FIG. 3, each of the end gripping means respectively carry helical ribs 24, 24' projecting from shank 12', ribs 24 oriented in the right-hand sense, with the other end having its threads or ribs 24' oriented in the opposite, left-hand sense. The manner in which this connector is installed will be discussed hereafter. In each of the embodiments of FIGS. 1 and 3, a handle 30, 30' or other lever arm means is provided to be integral with shank 12, 12' and attached generally medially therewith to permit rotation of the coupling about its shank axis during installation in the belt ends. It has been found that significant advantages are realized by constructing the handle 30 so that it is relatively thin (thickness "t") in the longitudinal direction of the coupling, and relatively thick (thickness "w") in the radial or transverse direction of the coupling means. This permits sidewise breaking off and removal of the handle after rotational insertion within the ends of the elastomeric belting, as shown in FIG. 4.

Figure 10:
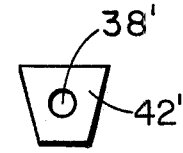
FIG. 10 shows an alternative belt cross section.
Figure 9:
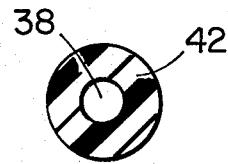
FIG. 9 is a sectional view along 9—9 of FIG. 4.

Referring more particularly to FIG. 4 showing the assembly splice, the ends of the elastomeric belting 32, 34, which may be of any desired cross section such as tubular (as depicted in FIG. 9), trapezoidal shape with end cavity 38' and wall 42' (as depicted in FIG. 10), and the like, are provided with respective cavities 36, 38 to accommodate the coupling connector. Solid elastomeric material in which the ends have been hollowed out may be used, although it is simplest to use hollow tubing. The belting may be formed of any of the traditional elastomers, such as natural and synthetic rubbers, thermoplastic elastomers, and the like. The belting should possess a desirable tensile modulus under the temperature ranges of operation. A material which has been found to be quite suitable is Cyanaprene 9346 (registered trademark) thermoplastic polyurethane characterized by 92 Shore A hardness and having a 100% modulus of 1220±100 at 72 degrees F. and 40 percent set elongation. Round tubing of 0.400 inches outside diameter by 0.125 inch inner bore has been found suitable as emergency fan belting stock.

The coupling connector may be formed of any high modulus material such as metal, but is preferably formed of a tough plastic such as fiber glass-filled nylon. Depending upon the application other suitable materials include polycarbonate, acetal, polysulfones, and polyesters, with and without fiber glass or other reinforcing loading.

The helical rib of head 16, particularly ramp surfaces 26 and 28 are substantially embedded in and penetrate into the wall 40 of the end 32 of the endless belting. Similarly, gripping head 14 including ramp 18 and base 20 becomes substantially embedded in wall 42 of the elastomeric belting end 34.

The components of the belt assembly may be provided in a kit as shown in FIG. 6, comprising an extra long length of belting material 44, a coupling means 10 preferably having one end thereof preinserted in an end 34 of the tubing, leaving a threaded gripping end 16 exposed, and a severing means such as a single edge razor blade 46 for cutting the belting to length.

To assemble the component parts of the emergency belting kit in the field, reference is made to FIG. 5. After the broken fan belt and remnants have been removed from the crank shaft and water pump/fan sheaves 50, 52 respectively, the length 44 of belting is wrapped around the pulleys and cut approximately one inch short of abutting contact, as shown. A square cut should be made with the razor blade 46. Unless there are other belts or equipment forward of the fan belt sheaves which would interfere with installation of the belt, the now sized but uncoupled belting segment 44 may then be removed from the sheaves and coupled together. This is accomplished by inserting the screw end 16 into end cavity 36 of the belting, and the coupling connector 10 rotated with the aid of handle 30 so as to bring the two ends of the belting tightly together. This is accomplished without twisting of the belting since the gripping head 14 will be free to turn within cavity 38. Longitudinal ribs or striations 48 are preferably provided on the outer surface of the tubing to aid in gripping the tube so that the screw coupling may be turned into the end of the belting without introducing twists or kinks in the belting.

After the coupling has joined the ends of the belting together as shown in FIG. 4, the handle 30 may be broken off by applying pressure to the end of the handle in the direction parallel to the shank axis. The belt may then be stretched over the pulleys and thereby seated in the grooves of the drive. Alternatively, the handle may be left in place and broken off automatically once the engine is started as the belt traverses the pulleys.

Although the emergency belting may also be entrained about additional accessory pulleys such as power steering sheave 54, normally the horsepower requirements for alternator sheave 56, air conditioning sheave 58 and air pump sheave 60 are too great to permit driving those elements for any significant distance, given present belting materials.

Figure 7:
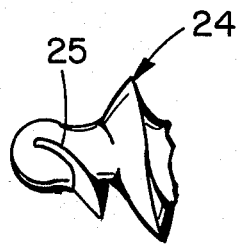
FIG. 7 is a detailed view of a marginal end of the coupler of FIG. 1 or 3 showing an alternative embodiment.
Figure 8:
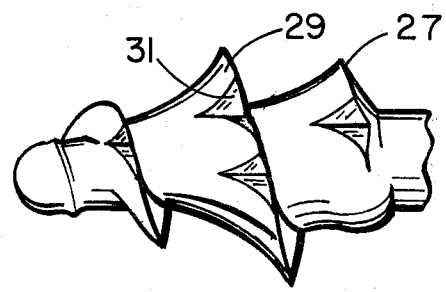
FIG. 8 is a side view of a further alternative coupling means having discontinuous ribs.

Additional embodiments of the couplings are shown in FIGS. 2, 7 and 8. In FIG. 2, an alternative type of screw useful in the invention is shown. The gripping head 14' may be configured similarly to that shown in FIGS. 1 and 4. The circular edge gripping surface 15 should be relatively sharp, but not so sharp that it will cut or tear the elastomeric material in operation under load. The opposite gripping end of the coupling is formed of a typical sheet metal screw thread 62 of continuous helical turns or ribs protruding from a base shank 61. The leading and trailing ramp surfaces of the threads are relatively upright as in a typical metal screw, such as a number 14 sheet metal screw type A. The screw has further been modified by provision of a central hole 64 through the shank 61 to receive a rod handle, such as a nail or the like, for rotation of the coupling to facilitate insertion, serving the same function as the handle 30 of the FIG. 1 embodiment. Alternatively, a T-handle may be welded or soldered to the shank preferably provided with an oriented break-off notch (not shown).

In FIG. 7, the very tip of the helical rib 24 has been modified at 25 to produce a sharp lead-in angle, which has been found to facilitate starting of the screw coupling in the end cavity of the belting as well as resisting unscrewing. The tip is rounded so it won't cut into the inside of the belting.

In the embodiment of FIG. 8, the helical rib is in the form of a plurality of individual ribs 27, 29, etc., which are disjoined, although which all follow the given continuous helical path. In this form, they produce discontinuous members with slots 31 formed therebetween which serve to further embed the elastomeric material and prevent withdrawal or pull-out from the assembled belting. The slots 31 are sloped as shown to allow easy insertion, but difficult withdrawal.

It is believed that the use of helical ribs or threads as the gripping surface according to the subject invention results in distributing the load more evenly through the elastomeric structure of the belt end, rather than creating a single weak plane transversely through the belting as is typical of the discrete gripping heads of the prior art. The extended thread surface provides a greater surface area for improved holding power, and increased pull-out strengths. This belief has been substantiated through field testing in which the emergency belting was used as a fan/water pump belt on a Plymouth Valiant equipped with a 318 V-8 motor. The FIG. 1 embodiment connector was employed, made of Nylafil G 10-40 (registered trademark), a type 66 nylon loaded with 40 percent, ⅜ inch long fiber glass filaments. The thread diameter was 0.270 inches and the pitch 0.090 inches. The car ran 1110 miles without failure of the emergency belting, and then the belting was removed. Inspection showed some wear of the outer surface of the belting in the splice area, with the connector still in serviceable condition.

While certain representative embodiments and details have been shown for the purpose of illustrating the invention, it will be apparent to those skilled in this art that various changes and modifications may be made therein without departing from the sphere or scope of the invention. For instance, the FIG. 1 or 3 fastener embodiments could be provided with a central hole to receive a rod, as in the FIG. 2 embodiments, to substitute for handle 30 or 30'.

What is claimed is:

1. In an endless belt assembly including a belt of elastomeric material having internal cavities in the ends thereof, and coupling means having respective end gripping means securely engaged in the internal cavities of the belting, the improvement comprising:
   a coupling means having a smooth central shank portion and having one of the respective end gripping means formed of a helical rib projecting radially outwardly from the shank portion, and the other of the end gripping means in the configuration of a sharp edged head;
   said rib penetrating the wall of the elastomeric belt and substantially embedding therein; and
   said central shank portion adapted and arranged to engage lever arm means for rotating the coupling about its shank axis to couple the ends of the belt together.

2. The belt assembly of claim 1 wherein the elastomeric belting is formed of hollow tubing, the outer surface of which carries longitudinal ribs to enhance grasping the tubing.

3. The belt assembly of claim 1 wherein the elastomeric belting is V-shaped (trapezoidal).

4. The belt assembly of claim 2 or claim 3 wherein the elastomeric belting is formed of a tear-resistant thermoplastic urethane, and the coupling means material is selected from plastic and metal.

5. The belt assembly of claim 1 wherein the coupling means is formed of fiber reinforced plastic.

6. The belt assembly of claim 1 wherein said central shank portion is provided with a bore transverse to the shank axis, for receiving said lever arm means.

7. The belt assembly of claim 1 wherein the helical rib gripping means is in the form of asymmetrical threads having a leading ramp of gentle slope relative to a trailing ramp of steep slope.

8. Coupling means adapted to join together ends of elastomeric belting, comprising:
   a central shank;
   first and second gripping means attached respectively to opposite ends of the shank, at least one of said gripping means being formed of a helical rib projecting radially from the shank; and
   handle means integrally attached to the shank generally medially thereof for rotating the coupling means about the axis of the shank, the handle being relatively thin in the longitudinal direction of the coupling means, and relatively thick in the radial direction of the coupling means, permitting sidewise breaking off of the handle after rotational insertion within the ends of the elastomeric belting.

9. An endless belt assembly kit having component parts capable of being assembled in the field to produce the endless belt and capable of being entrained about cooperating sheaves, the kit comprising:
   a belt of elastomeric material being provided with respective internal cavities in the ends of the belt;
   coupling means adapted to join together the ends of the belt, comprising a central shank and first and second end gripping means attached to the shank adapted to be securely received in the respective cavities of the belt;
   at least one of said gripping means being formed of a helical rib projecting radially from the shank and in assembly adapted to penetrate the walls of the elastomeric belt and grip the same, said helical rib configured as an asymmetrical thread having a leading ramp of gentle slope relative to a trailing ramp of steep slope; and
   said coupling means being provided with a medially disposed handle protruding from the shank, and adapted to be rotated to facilitate insertion of the helically ribbed gripping means end into the internal cavity of the belt, the handle being relatively thin in the longitudinal direction of the coupling means, and relatively thick in the radial direction of the coupling means, permitting sidewise breaking off of the handle after rotational insertion within the ends of the elastomeric belting.

10. Coupling means adapted to join together ends of elastomeric belting, comprising:
    a central, generally smooth shank;
    first and second gripping means attached respectively to opposite ends of the shank, at least one of said gripping means formed of a helical rib projecting radially from the shank and formed as asymmetrical threads having a leading ramp of gentle slope relative to a trailing ramp of steep slope; and
    elongated handle means integrally attached generally medially along the shank and extending generally transverse to the axis of the shank a sufficient distance to be graspable by hand for rotation of the coupling means about the axis of the shank, the handle means being relatively thin in the longitudinal direction of the coupling means, and relatively thick in the radial direction of the coupling means, permitting sidewise breaking off of the handle after rotational insertion within the ends of the elastomeric belting.

* * * * *